United States Patent
Lee

(10) Patent No.: US 9,215,373 B2
(45) Date of Patent: Dec. 15, 2015

(54) APPARATUS AND METHOD FOR COMPENSATING HAND BLUR

(71) Applicant: LG INNOTEK CO., LTD., Seoul (KR)

(72) Inventor: Jung Hyun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 10 days.

(21) Appl. No.: 14/361,214

(22) PCT Filed: Dec. 7, 2012

(86) PCT No.: PCT/KR2012/010653
§ 371 (c)(1),
(2) Date: May 28, 2014

(87) PCT Pub. No.: WO2013/085355
PCT Pub. Date: Jun. 13, 2013

(65) Prior Publication Data
US 2014/0333785 A1    Nov. 13, 2014

(30) Foreign Application Priority Data

Dec. 9, 2011  (KR) .................. 10-2011-0131666
Dec. 7, 2012  (KR) .................. 10-2012-0141592

(51) Int. Cl.
*H04N 5/232* (2006.01)
*G03B 5/00* (2006.01)
*G02B 27/64* (2006.01)

(52) U.S. Cl.
CPC ............ *H04N 5/23287* (2013.01); *G02B 27/64* (2013.01); *G03B 5/00* (2013.01); *H04N 5/23212* (2013.01); *H04N 5/23258* (2013.01); *G03B 2217/005* (2013.01)

(58) Field of Classification Search
CPC .......... H04N 5/23212; H04N 5/23258; H04N 5/23287; G02B 27/64–27/646; G03B 5/00–5/08; G03B 2217/005
See application file for complete search history.

(56) References Cited

U.S. PATENT DOCUMENTS

| | | | |
|---|---|---|---|
| 2005/0196160 A1* | 9/2005 | Uenaka | 396/55 |
| 2005/0248662 A1* | 11/2005 | Yamazaki | 348/208.99 |
| 2008/0145041 A1* | 6/2008 | Enomoto | 396/53 |
| 2010/0302386 A1* | 12/2010 | Hoshino | 348/208.4 |
| 2011/0013031 A1* | 1/2011 | Miyasako | 348/208.99 |

(Continued)

FOREIGN PATENT DOCUMENTS

| | | |
|---|---|---|
| JP | 2004-294569 A | 10/2004 |
| JP | 2004-348147 A | 12/2004 |

(Continued)

OTHER PUBLICATIONS

International Search Report in International Application No. PCT/KR2012/010653, filed Dec. 7, 2012.

*Primary Examiner* — Jason Flohre
(74) *Attorney, Agent, or Firm* — Saliwanchik, Lloyd & Eisenschenk

(57) ABSTRACT

An apparatus and method for compensating hand blur are disclosed. The method according to an exemplary embodiment of the present invention comprises receiving an angular velocity by tilt of the camera module, determining a first driving signal for driving the second actuator using the angular velocity, calculating a ratio of effective focal length relative to a lens moving distance using the driving of the first actuator, and determining a second driving signal amplifying the first driving signal, using the ratio of effective focal length relative to the lens moving distance.

15 Claims, 2 Drawing Sheets

(56) References Cited

U.S. PATENT DOCUMENTS

2013/0004150 A1* 1/2013 Wakamatsu .................. 396/55
2013/0063615 A1* 3/2013 Takeuchi .................. 348/208.5

FOREIGN PATENT DOCUMENTS

| JP | 2011-022352 A | 2/2011 |
| KR | 10-2006-0088069 A | 8/2006 |

* cited by examiner

APPARATUS AND METHOD FOR COMPENSATING HAND BLUR

CROSS-REFERENCE TO RELATED APPLICATIONS

This application is the U.S. national stage application of International Patent Application No. PCT/KR2012/010653, filed Dec. 7, 2012, which claims priority to Korean Application No. 10-2011-0131666, filed Dec. 9, 2011, and Korean Application No. 10-2012-0141592, filed Dec. 7, 2012, the disclosures of each of which are incorporated herein by reference in their entirety.

TECHNICAL FIELD

The teachings in accordance with exemplary and non-limiting embodiments of this invention relate generally to an apparatus and method for compensating hand blur.

BACKGROUND ART

Generally, an exposure time of a camera module increases under a low illumination environment, and under this circumstance, problems including motion blurs caused by a moving target or image blurs such as hand blurs caused by handshake may occur. Likewise, problems occur disabling to photograph a stable video (moving image) due to trembling or shake of a camera module due to generation of tilt by outside trembling.

In order to prevent the abovementioned conventional problems, camera modules mounted with an OIS (Optical Image Stabilizer) has been used. That is, an OIS is provided to a camera module in the form of an actuator, and shifts a lens along with an AF (Auto Focus) actuator. The OIS is a mechanical actuator capable of horizontally shifting a lens or a barrel mounted with a lens, or tilting a camera itself to a yaw direction or a pitch direction.

However, the conventional OIS camera module suffers from problems in that a lens shifting or tilt compensation is applied at a fixed focal length, with no consideration of changes in focal lengths including zoom and AF, such that information on an existing fixed focus is inconsistent when the focal length is changed to thereby generating a compensation error.

DISCLOSURE OF INVENTION

Technical Problem

Accordingly, the present invention has been made keeping in mind the above disadvantages/problems occurring in the prior art, and an object of the present invention is to provide an apparatus for compensating hand blur configured to minimize compensation errors in an OIS (Optical Image Stabilizer) by calculating ratio of effective focal length of a lens moving distance, and a method for compensating hand blur.

Solution to Problem

In order to accomplish the above object, in one general aspect of the present invention, there is provided an apparatus for compensating an image blur caused by hand blur of a camera module including a first actuator for AF (Auto Focus)/zoom, and a second actuator for OIS (Optical Image Stabilizer), the apparatus comprising: a controller determining a first driving signal for driving the second actuator using angular velocity information by tilt of the camera module; a calculator calculating a ratio of effective focal length relative to a lens moving distance, in a case a lens focal length is changed by the first actuator; and an amplifier determining a second driving signal amplifying the first driving signal, using the ratio of effective focal length relative to the lens moving distance.

In some exemplary embodiments, the apparatus may further comprise an angular velocity sensor detecting an angular velocity by the tilt of the camera module.

In some exemplary embodiments, the apparatus may further comprise a first driving unit driving the first actuator.

In some exemplary embodiments, the first driving unit may provide code information based on lens movement to the calculator.

In some exemplary embodiments, the calculator may calculate the ratio of effective focal length relative to the lens moving distance by determining the lens moving distance using the code information based on the lens movement.

In some exemplary embodiments, the apparatus may further comprise storage storing lens moving distance corresponding to the code information based on the lens movement.

In some exemplary embodiments, the calculator may calculate the ratio of effective focal length relative to the lens moving distance by receiving the lens moving distance from the storage.

In some exemplary embodiments, the apparatus may further comprise a second driving unit driving the second actuator using the second driving signal.

In some exemplary embodiments, the controller may obtain an angle tilted by the camera module by integrating the angular velocity, and determining the first driving signal using a compensation stroke by obtaining the compensation stroke from the tilted angle.

In another general aspect of the present invention, there is provided a method for compensating image blur caused by hand blur in a camera module including a first actuator for AF (Auto Focus)/zoom, and a second actuator for OIS (Optical Image Stabilizer), the method comprising: receiving an angular velocity by tilt of the camera module; determining a first driving signal for driving the second actuator using the angular velocity; calculating a ratio of effective focal length relative to a lens moving distance using the driving of the first actuator; and determining a second driving signal amplifying the first driving signal, using the ratio of effective focal length relative to the lens moving distance.

In some exemplary embodiments, the determining the first driving signal may include obtaining an angle tilted by the camera module by integrating the angular velocity; obtaining a compensation stroke using the tilted angle; and determining the first driving signal using the compensation stroke.

In some exemplary embodiments, the calculating the ratio may comprise receiving code information based on the lens movement; determining the lens moving distance using the code information; and calculating the ratio of effective focal length relative to the lens moving distance.

In some exemplary embodiments, the calculating the ratio of effective focal length relative to the lens moving distance may comprise receiving the lens moving distance corresponding to the code information based on the lens movement; and calculating the ratio of effective focal length relative to the lens moving distance.

In some exemplary embodiments, the second driving signal may be determined by the following Math Figure:

$$\Delta V' = \Delta V \cdot (1 + \text{Ratio})$$

where, ΔV' is the second driving signal, ΔV is the first driving signal, Ratio is a ratio of effective focal length relative to the lens moving distance.

In some exemplary embodiments, the method may further comprise driving the second actuator using the first driving signal or the second driving signal.

Advantageous Effects of Invention

The apparatus and method for compensating hand blur according to the exemplary embodiments of the present invention have an advantageous effect in that image blur can be compensated in response to changes in lens focal length by calculating a ratio of effective focal length (EFL) based on a moving distance (D) on a roll axis of a lens, and reflecting the ratio of EFL on a driving signal of an OIS (Optical Image Stabilizer) actuator.

Another advantageous effect is that an OIS compensation error can be minimized by compensating the image blur in response to the changes in the lens focal length.

BEST MODE FOR CARRYING OUT THE INVENTION

Although the present invention may be devised by numerous other modifications and embodiments, particular exemplary embodiments will be exemplified by the drawings and explained in detail by the Detailed Description of the present invention. However, it should be understood that the present invention is not limited to any particular exemplary embodiments, but encompasses all other modifications, equivalents and variations without departing from the spirit or scope of the invention.

Now, blur compensation error in response to changes in a lens focal length of a camera module having an OIS (Optical Image Stabilizer) according to the prior art will be illustrated and explained with reference to the accompanying drawings, and exemplary embodiments of the present invention will be explained in detail.

Figure 1:
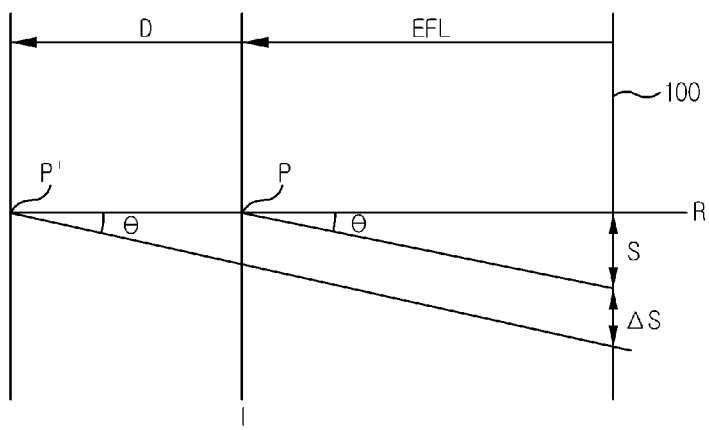
FIG. 1 is an exemplary view explaining a blur compensation error in response to changes in the lens focal length of a camera module according to prior art.

FIG. 1 is an exemplary view explaining a blur compensation error in response to changes in the lens focal length of a camera module according to prior art, where, in a case P is a position of a principal point of a lens at an infinity (I), a distance on a roll axis (R) from the P to a sensor surface (100) is an EFL (Effective Focal Length).

Under this circumstance, in a case a camera module is tilted by hand blur as much as "θ" to a yaw axis or a pitch axis, a blur is generated on the sensor surface (100), because an image is moved from a center of R axis. In this case, a compensation stroke (S) relative to the image blur may be obtained by the following Math Figure 1.

MathFigure 1

$$S = EEL \cdot \text{TAN}(\theta \cdot \frac{\pi}{180})$$ [Math. 1]

Figure 2:
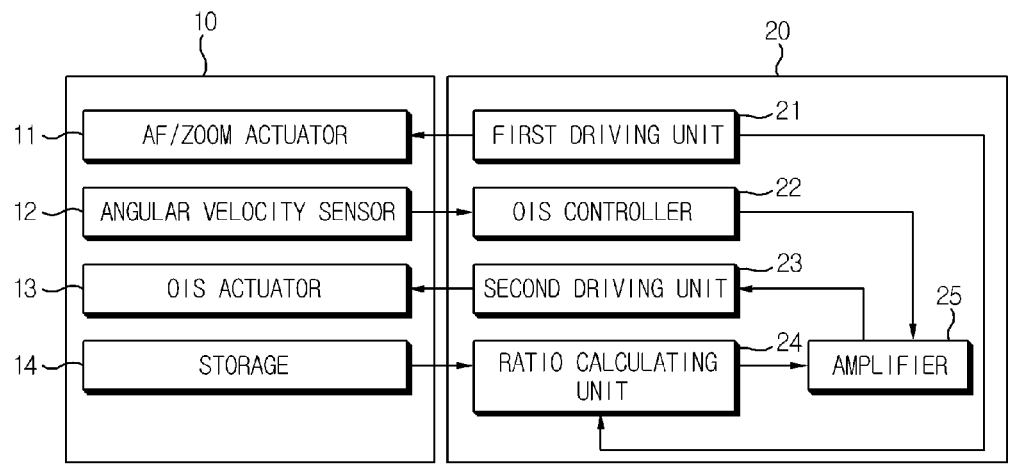
FIG. 2 is a block diagram illustrating an apparatus for compensating hand blur according to an exemplary embodiment of the present invention.

At this time, a pixel amount to be compensated may be obtained by the following Math Figure 2.

MathFigure 2

$$\text{Lens\_blur} = \frac{S}{\text{Pixel\_Pitch}}$$ [Math. 2]

That is, in a case an EFL is fixed and an OIS actuator is generated with a tilt as much as θ in Math Figure 1, a compensation as much as a distance S in Math Figure 1 is required to compensate a pixel in Math Figure 2.

Figure 3:
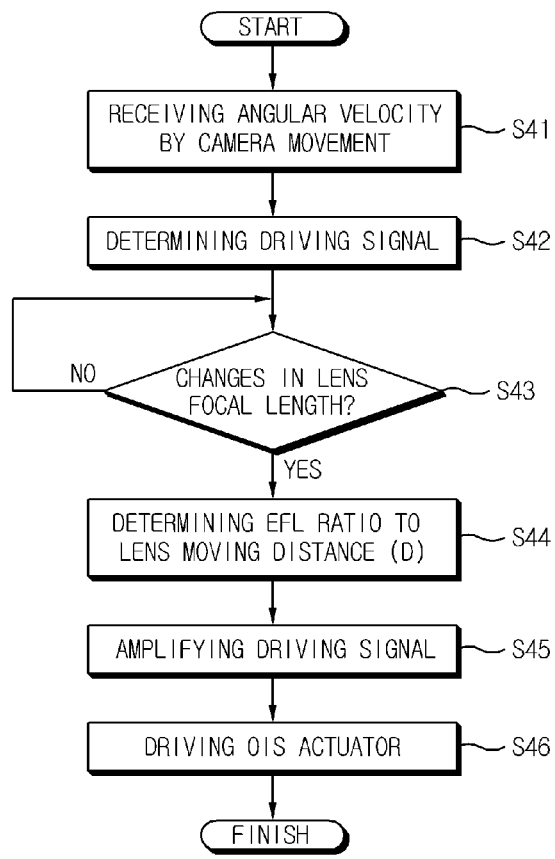
FIG. 3 is a flowchart illustrating a method for compensating hand blur according to an exemplary embodiment of the present invention.

However, in a case a focal length is changed by the lens being positioned at P along the R axis by an AF (Auto Focus) or a zoom actuator, a stroke change ΔS by a lens moving distance D may be obtained by the following Math Figure 3.

MathFigure 3

$$\Delta S = D \cdot \text{TAN}(\theta \cdot \frac{\pi}{180})$$ [Math. 3]

Thus, although a total stroke for compensating the blur must be "S+ΔS", a conventional camera module cannot cope with a stroke change in response to changes in focal length.

By way of non-limiting example, in a case a tilt is generated on the lens to a yaw axis as much as 1° and to a pitch axis as much as 0.8°, and a focal length of the lens is changed as much as 0.2 mm by AF or zoom actuator, an increased amount of image blur in response to the focal length change, i.e., a blur amount to be compensated by the OIS, may be obtained by the following Math Figures (assuming that an EFL is 4.24 mm, and a pixel pitch of an image sensor is 0.0014 mm, which are general numerical values).

MathFigure 4

$$\text{Lens\_blur\_Yaw} = \frac{0.2 \times 0.017455}{0.0014}$$ [Math. 4]
$$\cong 2.5 (\text{pixel})$$
$$\text{Lens\_blur\_Pch} = \frac{0.2 \times 0.013964}{0.0014}$$
$$\cong 2.0 (\text{pixel})$$

That is, in a case the lens has moved as much as 0.2 mm, an increased blur amount on the yaw axis is 2.5 pixels, and an increased blur amount on the pitch axis is 2.0 pixels. Thus, in a case a focal length is changed on the roll axis by the AF or the zoom actuator, the blur must be compensated by reflecting a stroke change corresponding to the changed focal length.

In a case an OIS compensation rate is R on a percentage base, and D=0, an OIS compensation deviation error may be obtained by the following Math Figure 5, and an OIS compensation error may be obtained by the following Math Figure 6, in a case a change in focal length is generated as much as the lens moving distance D.

MathFigure 5

$$\text{error} = 1 - R \quad \text{[Math. 5]}$$

MathFigure 6

$$\text{error} = 1 - \left(\frac{EFL}{EFL+D}\right) \cdot R \quad \text{[Math. 6]}$$

By way of non-limiting example, an OIS camera having a compensation ratio of 0.95 (i.e., 95%) may generate an error of 0.05 (5%), and in this camera, in a case a focal length is changed as much as 0.2 mm, a compensation error may increase as much as 4.27% P as shown in the following Math Figure 7.

MathFigure 7

$$\begin{aligned}\text{error} &= 1 - \left(\frac{EFL}{EFL+D}\right) \cdot R \\ &= 1 - \left(\frac{4.24}{4.44}\right) \times 0.95 \\ &= 9.27\%\end{aligned} \quad \text{[Math. 7]}$$

Particularly, in a case of a zoom camera module, as the moving distance D is relatively greater than that of an AF camera module, a blur pixel in response to the change in focal length increases, whereby it can be confirmed that an error increases.

Meanwhile, according to the abovementioned Math Figures 1 and 3, ΔS may be expressed by the following Math Figure 8.

MathFigure 8

$$\begin{aligned}\text{TAN}\left(\theta \cdot \frac{\pi}{180}\right) &= \frac{S}{EFL} \\ &= \frac{\Delta S}{D} \\ \Delta S &= S \cdot \frac{D}{EFL}\end{aligned} \quad \text{[Math. 8]}$$

The apparatus for compensating hand blur according to an exemplary embodiment of the present invention can change a driving signal for control of an OIS actuator by calculating a ratio of effective focal length (EFL) based on a moving distance (D) on a roll axis of a lens, and compensate an image blue, in a case a change in focal length is generated by AF/zoom actuator, thereby minimizing an OIS compensation error.

Now, an apparatus for compensating hand blur according to an exemplary embodiment of the present invention will be described with reference to FIG. 2.

FIG. 2 is a block diagram illustrating an apparatus for compensating hand blur according to an exemplary embodiment of the present invention.

Referring to FIG. 2, an apparatus (20) for compensating hand blur (hereinafter referred to as "compensating apparatus") according to an exemplary embodiment of the present invention, which is to receive an angular velocity in response to a tilt from an angular velocity sensor of a camera module (10), and to drive an AF/zoom actuator (11) and an OIS actuator (13) using the angular velocity, includes a first driving unit (21), an OIS controller (22), a second driving unit (23), a ratio calculation unit (24), and an amplifier (25).

Furthermore, the camera module (10) includes an AF/zoom actuator (11), an angular velocity sensor (12), an OIS actuator (13) and storage (14).

Although detailed configurations of the camera module (10) and the apparatus (20) for compensating hand blur are separately illustrated for convenience sake, it should be understood that each configuration may be mixed together. By way of non-limiting example, the apparatus (20) may be provided inside the camera module (10).

The OIS controller (22) receives an angular velocity (ω) of the camera module (10) from the angular velocity sensor (12), integrates the angular velocity, obtains an angle (θ) tilted by the camera, and determines a compensation stroke (S) corresponding to the angle (θ) from the Math Figure 1. Furthermore, an electrical driving signal (ΔV) for driving the OIS actuator (13) may be determined using the compensation stroke (S).

The first driving unit (21) transmits code information based on lens movement to the ratio calculation unit (24), in a case there is a change in a lens focal length.

The storage (14) stores information of lens moving distance (D) corresponding to the code information based on the lens movement. The storage (14) may be an OTP (One-Time Programmable) EPROM (Erasable-Programmable ROM), for example.

The ratio calculation unit (24) receives the information on the lens moving distance (D) from the storage (14) to calculate a ratio of an EFL (Effective Focal Length) relative to the lens moving distance (D). Generally, the EFL is determined at the time of manufacturing of a camera. That is, the ratio calculation unit (24) calculates the ratio according to Math Figure 9.

MathFigure 9

$$\text{Ratio} = \frac{D}{EFL} \quad \text{[Math. 9]}$$

Meanwhile, in a case of closed loop system such as a feedback AF, the ratio calculation unit (24) directly determines the lens moving distance (D) using feedback code information in response to the lens movement. That is, the storage (14) may not store the information on focal length corresponding to the code information based on the lens movement, and the ratio calculation unit (24) may calculate the information.

The amplifier (25) receives the ratio of EFL relative to the lens moving distance (D) from the ratio calculation unit (24), and amplifies a driving signal in response to the lens movement. In the exemplary embodiment of the present invention, a stroke (S+ΔS) of lens to be rotated by the OIS actuator (13) may be expressed by the following Math Figure 10.

MathFigure 10

$$S + \Delta S = S + S \cdot \frac{D}{EFL} \rightarrow \Delta V + \Delta V \cdot \frac{D}{EFL} \quad \text{[Math. 10]}$$

Thus, the amplifier (25) amplifies the driving signal (ΔV) received from the OIS controller (22) using ΔV' of the following Math Figure 11.

MathFigure 11

$$\Delta V' = \Delta V \cdot (1 + \text{Ratio})$$ [Math. 11]

In a case the amplifier (25) transmits the amplified driving signal to the second driving unit (23), the second driving unit (23) is driven by the driving signal amplified by the OIS actuator (13) to compensate the image blur. The second driving unit (23) may be a driver IC, for example, but the present invention is not limited thereto.

FIG. 3 is a flowchart illustrating a method for compensating hand blur according to an exemplary embodiment of the present invention.

Referring to FIG. 3, the method for compensating hand blur according to an exemplary embodiment of the present invention is to receive an angular velocity (ω) in response to a camera movement from an angular velocity sensor (12) of a camera module (10) (S41). An OIS controller (22) having received the angular velocity (ω) obtains an angle (θ) tilted about a yaw axis or a pitch axis of a camera by integrating the angular velocity (ω) and obtains a compensation stroke (S) corresponding to the angle (θ). Thereafter, the OIS controller (22) determines an electrical driving signal (ΔV) for driving an OIS actuator (13) (S42).

In a case a change in lens focal length is received from a first driving unit (21) by driving, by a first driving unit (21), an AF/zoom actuator (S43), the first driving unit (21) transmits code information based on the lens movement to a ratio calculation unit (24).

The ratio calculation unit (24) receives information on a lens moving distance (D) corresponding to the code information in response to the lens movement from storage (14), or directly calculates the information on the lens moving distance (D) corresponding to the code information to determine a ratio of an EFL relative to the lens moving distance (D) (S44).

An amplifier (25) receives the ration of EFL relative to the lens moving distance (D), and amplifies the electrical driving signal (ΔV) for driving an OIS actuator (13) using ΔV' of Math Figure 11 (S46), thereby compensating an image blur.

Although a camera module mounted with a conventional OIS cannot solve an image blur due to increased focal length by an AF or zoom actuator, the exemplary embodiments of the present invention can compensate an image blur by differently controlling a driving signal of an OIS actuator and by calculating a ratio of EFL in response to a lens moving distance (D) on a roll axis, whereby an OIS compensation error can be minimized.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The apparatus and method for compensating hand blur according to the exemplary embodiments of the invention have an industrial applicability in that image blur can be compensated in response to changes in lens focal length by calculating a ratio of effective focal length (EFL) based on a moving distance (D) on a roll axis of a lens, and reflecting the ratio of EFL on a driving signal of an OIS (Optical Image Stabilizer) actuator, and an OIS compensation error can be minimized by compensating the image blur in response to the changes in the lens focal length.

The invention claimed is:

1. An apparatus for compensating an image blur caused by hand blur of a camera module including a first actuator for AF (Auto Focus)/zoom, and a second actuator for OIS (Optical Image Stabilizer), the apparatus comprising:
   a controller configured to determine a first driving signal for driving the second actuator using angular velocity information by tilt of the camera module;
   a calculator configured to calculate a ratio of effective focal length relative to a lens moving distance, in a case a lens focal length is changed by the first actuator; and
   an amplifier configured to determine a second driving signal amplifying the first driving signal, using the ratio of effective focal length relative to the lens moving distance.

2. The apparatus of claim 1, further comprising:
   an angular velocity sensor configured to detect an angular velocity by the tilt of the camera module.

3. The apparatus of claim 1, further comprising:
   a first driving unit configured to drive the first actuator.

4. The apparatus of claim 3, wherein the first driving unit provides code information based on lens movement to the calculator.

5. The apparatus of claim 4, wherein the calculator calculates the ratio of effective focal length relative to the lens moving distance by determining the lens moving distance using the code information based on the lens movement.

6. The apparatus of claim 3, further comprising:
   storage configured to store lens moving distance corresponding to the code information based on the lens movement.

7. The apparatus of claim 6, wherein the calculator calculates the ratio of effective focal length relative to the lens moving distance by receiving the lens moving distance from the storage.

8. The apparatus of claim 1, further comprising:
   a second driving unit configured to drive the second actuator using the second driving signal.

9. The apparatus of claim 1, wherein the controller obtains an angle tilted by the camera module by integrating the angular velocity, and determines the first driving signal using a compensation stroke by obtaining the compensation stroke from the tilted angle.

10. A method for compensating image blur caused by hand blur in a camera module including a first actuator for AF (Auto Focus)/zoom, and a second actuator for OIS (Optical Image Stabilizer), the method comprising:
    receiving an angular velocity by tilt of the camera module;
    determining a first driving signal for driving the second actuator using the angular velocity;
    calculating a ratio of effective focal length relative to a lens moving distance using the driving of the first actuator; and
    determining a second driving signal amplifying the first driving signal, using the ratio of effective focal length relative to the lens moving distance.

11. The method of claim 10, wherein the determining the first driving signal comprises:
    obtaining an angle tilted by the camera module by integrating the angular velocity;
    obtaining a compensation stroke using the tilted angle; and determining the first driving signal using the compensation stroke.

12. The method of claim 10, wherein the calculating the ratio comprises:
   receiving code information based on the lens movement;
   determining the lens moving distance using the code information; and
   calculating the ratio of effective focal length relative to the lens moving distance.

13. The method of claim 10, wherein the calculating the ratio of effective focal length relative to the lens moving distance comprises:
   receiving the lens moving distance corresponding to the code information based on the lens movement; and
   calculating the ratio of effective focal length relative to the lens moving distance.

14. The method of claim 10, wherein the second driving signal is determined by the following Math Figure:

$$\Delta V' = \Delta V \cdot (1 + \text{Ratio})$$

where, $\Delta V'$ is the second driving signal, $\Delta V$ is the first driving signal, Ratio is a ratio of effective focal length relative to the lens moving distance.

15. The method of claim 10, further comprising:
   driving the second actuator using the first driving signal or the second driving signal.

* * * * *